US008799895B2

(12) United States Patent
Koh et al.

(10) Patent No.: US 8,799,895 B2
(45) Date of Patent: Aug. 5, 2014

(54) VIRTUALIZATION-BASED RESOURCE MANAGEMENT APPARATUS AND METHOD AND COMPUTING SYSTEM FOR VIRTUALIZATION-BASED RESOURCE MANAGEMENT

(75) Inventors: Kwang Won Koh, Daejeon (KR); Jin Mee Kim, Daejeon (KR); Young Woo Jung, Seoul (KR); Young Choon Woo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 993 days.

(21) Appl. No.: 12/543,488

(22) Filed: Aug. 18, 2009

(65) Prior Publication Data

US 2010/0162259 A1 Jun. 24, 2010

(30) Foreign Application Priority Data

Dec. 22, 2008 (KR) .................. 10-2008-0131286
May 18, 2009 (KR) .................. 10-2009-0043132

(51) Int. Cl.
*G06F 9/455* (2006.01)
*G06F 9/46* (2006.01)
(52) U.S. Cl.
USPC ............................................ 718/1; 718/104
(58) Field of Classification Search
CPC ............ G06F 9/45544; G06F 9/45545; G06F 9/45558; G06F 9/455; G06F 9/5088; G06F 9/5083
USPC .......................................................... 718/1
See application file for complete search history.

(56) References Cited

U.S. PATENT DOCUMENTS

| 6,298,370 | B1* | 10/2001 | Tang et al. | 718/102 |
| 7,299,468 | B2* | 11/2007 | Casey et al. | 718/104 |
| 2005/0120160 | A1 | 6/2005 | Plouffe et al. | |
| 2006/0005184 | A1* | 1/2006 | Tewari et al. | 718/1 |
| 2006/0184349 | A1* | 8/2006 | Goud et al. | 703/24 |
| 2006/0195715 | A1* | 8/2006 | Herington | 714/4 |
| 2007/0255430 | A1* | 11/2007 | Sharma et al. | 700/20 |
| 2008/0127182 | A1* | 5/2008 | Newport et al. | 718/1 |
| 2008/0222633 | A1 | 9/2008 | Kami | |

(Continued)

FOREIGN PATENT DOCUMENTS

| JP | 9081401 A | 3/1997 |
| JP | 2004-199561 | 7/2004 |

(Continued)

OTHER PUBLICATIONS

Young-Woo Jung et al., "Standard-based Virtual Infrastructure Resource Management for Distributed and Heterogeneous Servers," Feb. 15, 2009, ICACT 2009.*

(Continued)

*Primary Examiner* — Lewis A Bullock, Jr.
*Assistant Examiner* — Kevin X Lu

(57) ABSTRACT

A computing system for virtualization-based resource management includes a plurality of physical machines, a plurality of virtual machines and a management virtual machine. The virtual machines are configured by virtualizing each of the plurality of physical machines. The management virtual machine is located at any one of the plurality physical machines. The management virtual machine monitors amounts of network resources utilized by the plurality of physical machines and time costs of the plurality of virtual machines, and performs a resource reallocation and a resource reclamation.

11 Claims, 6 Drawing Sheets

(56) References Cited

U.S. PATENT DOCUMENTS

| | | | | |
|---|---|---|---|---|
| 2008/0263390 A1* | 10/2008 | Baba et al. | | 714/4 |
| 2009/0138887 A1* | 5/2009 | Uehara et al. | | 718/104 |
| 2009/0254660 A1* | 10/2009 | Hanson et al. | | 709/226 |
| 2009/0271646 A1* | 10/2009 | Talwar et al. | | 713/322 |
| 2010/0083249 A1* | 4/2010 | Gupta et al. | | 718/1 |
| 2010/0242045 A1* | 9/2010 | Swamy et al. | | 718/104 |
| 2011/0041126 A1* | 2/2011 | Levy et al. | | 718/1 |

FOREIGN PATENT DOCUMENTS

| | | |
|---|---|---|
| JP | 2005-115653 A | 4/2005 |
| JP | 2008-107896 | 5/2008 |
| JP | 2008-225546 A | 9/2008 |
| JP | 2008217332 A | 9/2008 |
| KR | 1020080079124 A | 8/2008 |

OTHER PUBLICATIONS

Margaret Rouse, "Baseboard management controller (BMC)", May 2007, searchnetworking.techtarget.com/definition/baseboard-management-controller.*

Malgorzata Steinder et al., "Server Virtualization in Autonomic Management of Heterogeneous Workloads," ACM SIGOPS Operating System Review, pp. 94-95, IBM Thomas J. Watson Research Center, 2008.

* cited by examiner ated applications, according to application patterns used in the computing resources, such as processor, memory and input/output (I/O) resources. In other words, virtualization technology seeks to support a high overlap rate and a high utilization rate in applications by managing resources at the processor, memory and I/O resource level within the physical machines, instead of at the physical machine level.

VIRTUALIZATION-BASED RESOURCE MANAGEMENT APPARATUS AND METHOD AND COMPUTING SYSTEM FOR VIRTUALIZATION-BASED RESOURCE MANAGEMENT

CROSS-REFERENCE TO RELATED APPLICATIONS

This application claims priority under 35 U.S.C. §119 to Korean Patent Applications No. 10-2008-0131286, filed on Dec. 22, 2008, 10-2009-0043132, filed on May 18, 2009, in the Korean Intellectual Property Office, the disclosure of which is incorporated herein by reference in its entirety.

TECHNICAL FIELD

The following disclosure relates to virtualization technology, and in particular, to a virtualization-based resource management apparatus and method capable of collective resource self-management without intervention of a system administrator and a computing system for virtualization-based resource management.

BACKGROUND

International Data Corporation (IDC) predicted that, while purchasing costs of physical machines would not increase greatly, power and cooling costs would increase eight-fold, and server management and administration costs would increase four-fold. In practice, datacenters are operated with a focus on resource effectiveness over resource efficiency, which results in a doubling of administration, power and cooling costs every 9-24 months. Hence, there is a growing need to use IT resources efficiently, for example, by reducing costs incurred by administration, power and cooling by scaling down of datacenters.

To meet this need, virtualization technology is applied to a web server, a web application server, and a cluster for performing a large amount of computation in order to prevent some resources from remaining in idle state. That is, the resource utilization rate of physical machines is increased by operating the physical machines on processor-based or IO-based applications, according to application patterns used in the computing resources, such as processor, memory and input/output (I/O) resources. In other words, virtualization technology seeks to support a high overlap rate and a high utilization rate in applications by managing resources at the processor, memory and I/O resource level within the physical machines, instead of at the physical machine level.

Virtualization technology requires a resource manager that determines which physical machine provides resources required by a virtual machine. A management apparatus is needed to optimize resource consumption through self-management, based on loads required in a management function for the effective utilization of resources.

According to a related art virtualization-based resource management apparatus, a resource management application module running on an operating system (OS) manages one or more virtual machines. The resource management application module pre-estimates the capacity of physical machines according to the number of the virtual machines operating on the physical machines, resulting in the inefficient use of the physical machines. Furthermore, since network topology is configured statically, the resource management application module is unable to cope with variations in the amount of network resources used. Moreover, since resources consumed by the resource management apparatus itself are not managed, additional resources are not efficiently managed.

According to another related art virtualization-based resource management apparatus, a resource management application module runs on a virtual machine, and the virtual machine manages all physical machines and virtual machines designated for management, and manages a resource allocation relationship of the physical machines and the virtual machines. However, since the virtualization-based resource management apparatus itself does not recognize a virtualization environment, a system administrator separately monitors workloads of the virtualization-based resource management apparatus and performs additional resource allocation and resource reclamation. Consequently, due to the intervention of the system administrator, the efficiency of the resource management apparatus is lowered, and the load on the network IO is increased.

SUMMARY

In one aspect, a computing system for virtualization-based resource management comprises: a plurality of physical machines, a plurality of virtual machines configured by virtualizing each of the plurality of physical machines and a management virtual machine located at any one of the plurality physical machines to monitor amounts of network resources utilized by each of the plurality of physical machines and time costs of the plurality of virtual machines, and to perform a resource reallocation and a resource reclamation.

In another aspect, a virtualization-based resource management apparatus performs resource management of a computing system comprises: a plurality of physical machines and a plurality of virtual machines configured by virtualizing each of the plurality of physical machines. Herein, the virtualization-based resource management apparatus comprises: a management application module collecting and managing information on the plurality of physical machines and information on the plurality of virtual machines and a management control module monitoring a time cost for the management and performing an additional resource allocation and a resource reclamation, wherein the management application module and the management control module are located at any one of the plurality of physical machines.

In other aspect, a virtualization-based resource management method performing resource management of a computing system comprises: a plurality of physical machines, a plurality of virtual machines configured by virtualizing each of the plurality of physical machines, and a management virtual machine. Herein, the virtualization-based resource management method comprises: measuring a time cost spent when the management virtual machine manages entire resources of the computing system, determining whether the measured time cost falls within an allowable range and periodically confirming an adequacy of the physical machine at which the management virtual machine is currently located, when the measured time cost falls within the allowable range, and migrating the management virtual machine to other physical machine.

In other aspect, a virtualization-based resource management method is performed by a management virtual machine located at any one of a plurality of physical machines where one or more virtual machines are executed. Herein, the virtualization-based resource management method comprises: selecting a physical machine that uses the least amount of network resources among the plurality of physical machines, and positioning the management virtual machine to the selected physical machine, collecting and managing information on the one or more virtual machines, monitoring a time cost spent on the management and performing an additional resource allocation and a resource reclamation according to the monitoring result.

Other features and aspects will be apparent from the following detailed description, the drawings, and the claims.

DETAILED DESCRIPTION OF EMBODIMENTS

Figure 1:
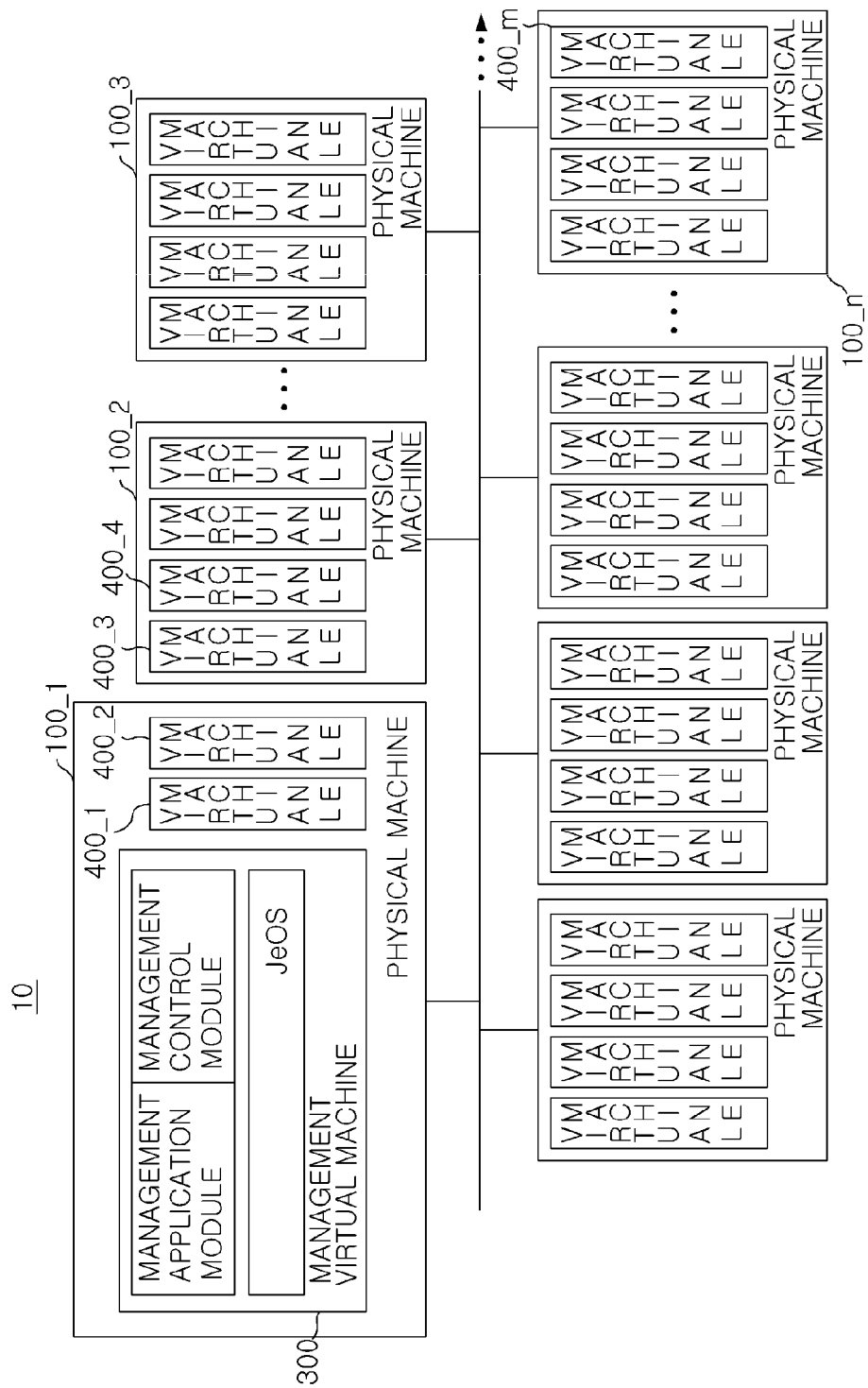
FIG. 1 is a block diagram illustrating an exemplary computing system for virtualization-based resource management.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

An exemplary computing system for virtualization-based resource management will be described below with reference to the accompanying drawings.

Figure 2:
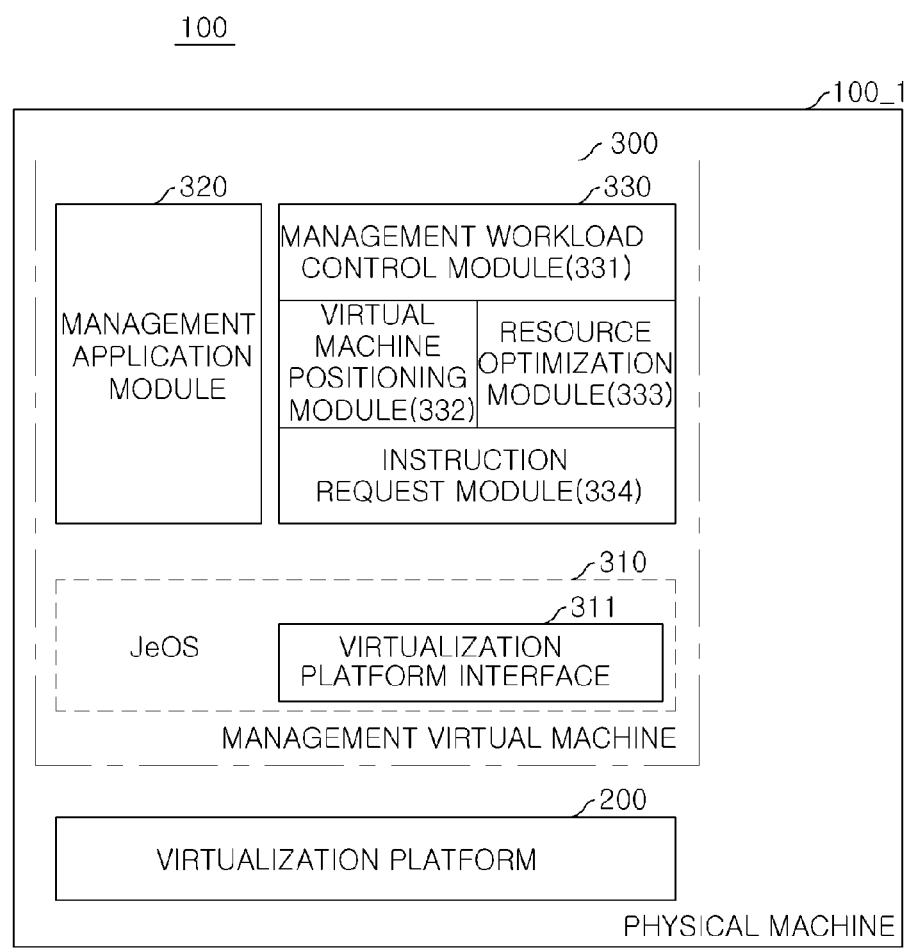
FIG. 2 is a block diagram illustrating an exemplary virtualization-based resource management apparatus.

FIG. 1 is a block diagram illustrating an exemplary computing system 10 for virtualization-based resource management and FIG. 2 is a block diagram illustrating an exemplary virtualization-based resource management apparatus 100.

Referring to FIG. 1, the exemplary computing system 10 for virtualization-based resource management includes first to n-th physical machines 100_1 to 100_n, a plurality of virtual machines 400_1 to 400_m located at the physical machines 100_1 to 100_n, and a virtualization-based resource management apparatus 100.

The first to n-th physical machines 100_1 to 100_n may be operation devices such as a web server, a web application server, a cluster and a computer.

One or more virtual machines 400_1 to 400_m are created in the first to n-th physical machines 100_1 to 100_n by application of virtualization technology. The virtual machines 400_1 to 400_m support a high application overlap rate through resource management at a processor, memory and I/O resource level inside the physical machines, not at a physical machine level. Consequently, a high system utilization rate is achieved.

Referring to FIG. 2, the virtualization-based resource management apparatus 100 includes a physical machine selected among the first to n-th physical machines 100_1 to 100_n, a virtualization platform 200 located at the selected physical machine, and a management virtual machine 300.

A virtualization platform located at a physical machine establishes a virtualization environment of the physical machine and creates a virtual machine. On the other hand, the virtualization platform 200 of the virtualization-based resource management apparatus 100 creates a management virtual machine 300 as well as the virtual machine.

The management virtual machine 300 manages the virtual machine created within the physical machine at which the management virtual machine 300 is located, and other virtual machines 400_1 to 400_m created at other physical machines inside the computing system 10. For convenience of explanation, it will be assumed that the management virtual machine 300 is first created at the first physical machine 100_1.

The exemplary virtualization-based resource management apparatus 100 according to the exemplary embodiment recognizes a virtualization environment and controls management workloads. As a result, the virtualization-based resource management apparatus 100 control so as to operate slowly through reclamation of resources necessary for management when the management operation of the management virtual machine 300 is executed faster than a predetermined reference time, and so as to operate faster through reallocation of resources when the management operation of the management virtual machine 300 is executed slower than the predetermined reference time. Moreover, the virtualization-based resource management apparatus 100 controls utilization of network resources. If network resources of the virtualization-based resource management apparatus 100 are deficient, the virtualization-based resource management apparatus 100 performs a migration of the management virtual machine 300 to a new physical machine which utilizes the least amount of the network resources within the computing system 10. Thus, the efficient resource management is continuously provided. If the management virtual machine 300 is migrated to the new physical machine, the new physical machine becomes the virtualization-based resource management apparatus 100.

Hereinafter, the management virtual machine 300 will be described in more detail.

The management virtual machine 300 includes a Just Enough Operating System (JeOS) 310, a management application module 320, and a management control module 330.

The JeOS 310 includes a virtualization platform interface 311 interfacing with the virtualization platform 200. The JeOS 310 is an OS that supports only functions required for resource management and has a smaller scale than a general-purpose OS.

The management application module 320 reads information on a list of the virtual machines 400_1 to 400_m and the first to n-th physical machines 100_1 to 100_n, information on an amount of resources used, and information on a resource allocation relationship and controls the status and utilization of the target resources.

The management control module 330 includes a management workload control module 331, a management virtual machine positioning module 332, a resource optimization module 333, and an instruction request module 334. The management control module 330 performs the resource allocation/reclamation and the migration of the management virtual machine 300.

The management workload control module 331 measures a time cost used for the resource management of the management application module 320, and transmits the measured time cost to the resource optimization module 333.

The management virtual machine positioning module 332 compares amounts of network resources utilized in the first to n-th physical machines 100_1 to 100_n, and searches and selects the physical machine that utilizes the least amount of network resources.

The resource optimization module 333 optimizes the workloads used in the management of the virtual machines by repeating the resource reallocation and the resource reclamation, based on the time cost measured by the management workload control module 331.

The instruction request module 334 requests the resource reallocation and reclamation of the management virtual machine 300 and the virtual machines 400_1 and 400_m and the migration of the management virtual machine 300 to the virtualization platform interface 311 of the JeOS 310 according to the request from the management virtual machine positioning module 332 or the resource optimization module 333.

The virtualization platform 200 receives the request from the instruction request module 334 through the virtualization platform interface 311, and performs the resource allocation, the resource reclamation and the migration of the management virtual machine 300.

As another exemplary embodiment, the virtualization platform interface 311 may be included in the management virtual machine 300 instead of the JeOS 310.

As mentioned above, the computing system 10 for virtualization-based resource management according to the exemplary embodiment creates the management virtual machine 300 in an arbitrary physical machine among the first to n-th physical machines 100_1 to 100_n, collects information on the virtual machines 400_1 to 400_m configured in the first to n-th physical machines 100_1 to 100_n through the management application module 320 of the management virtual machine 300 and manages the collected information.

In this case, while monitoring the time cost spent on management, the management control module 330 maximizes the management efficiency by additionally allocating or reclaiming the resources related to the management virtual machine 300 according to the monitoring result. Also, the management control module 330 searches and selects the physical machine that utilizes the least amount of network resources within the computing system 10, therefore the management virtual machine 300 can be automatically migrated to the selected physical machine.

Figure 3:
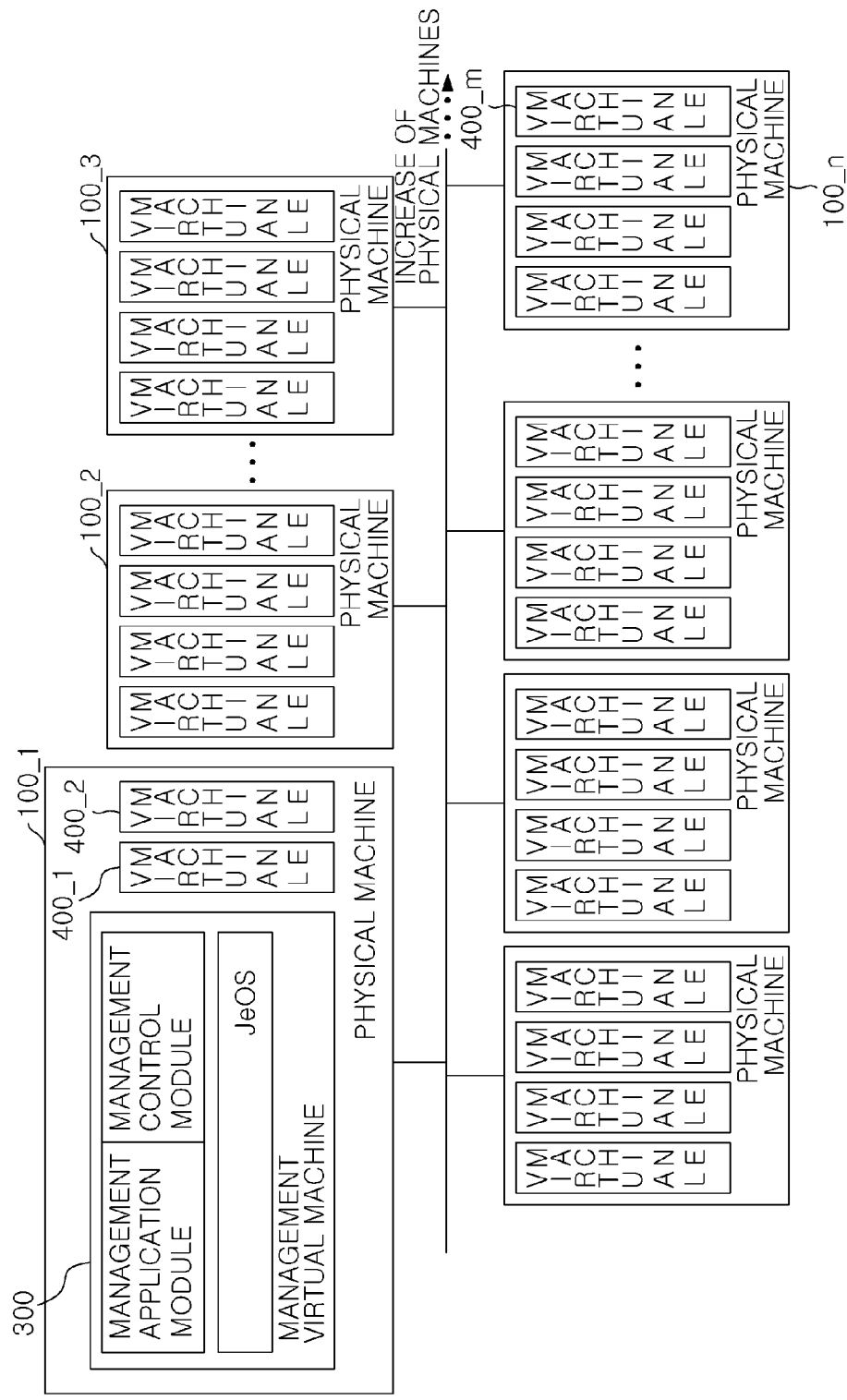
FIG. 3 is a block diagram illustrating an exemplary management virtual machine that requests resource reallocation when management workload increases.
Figure 4:
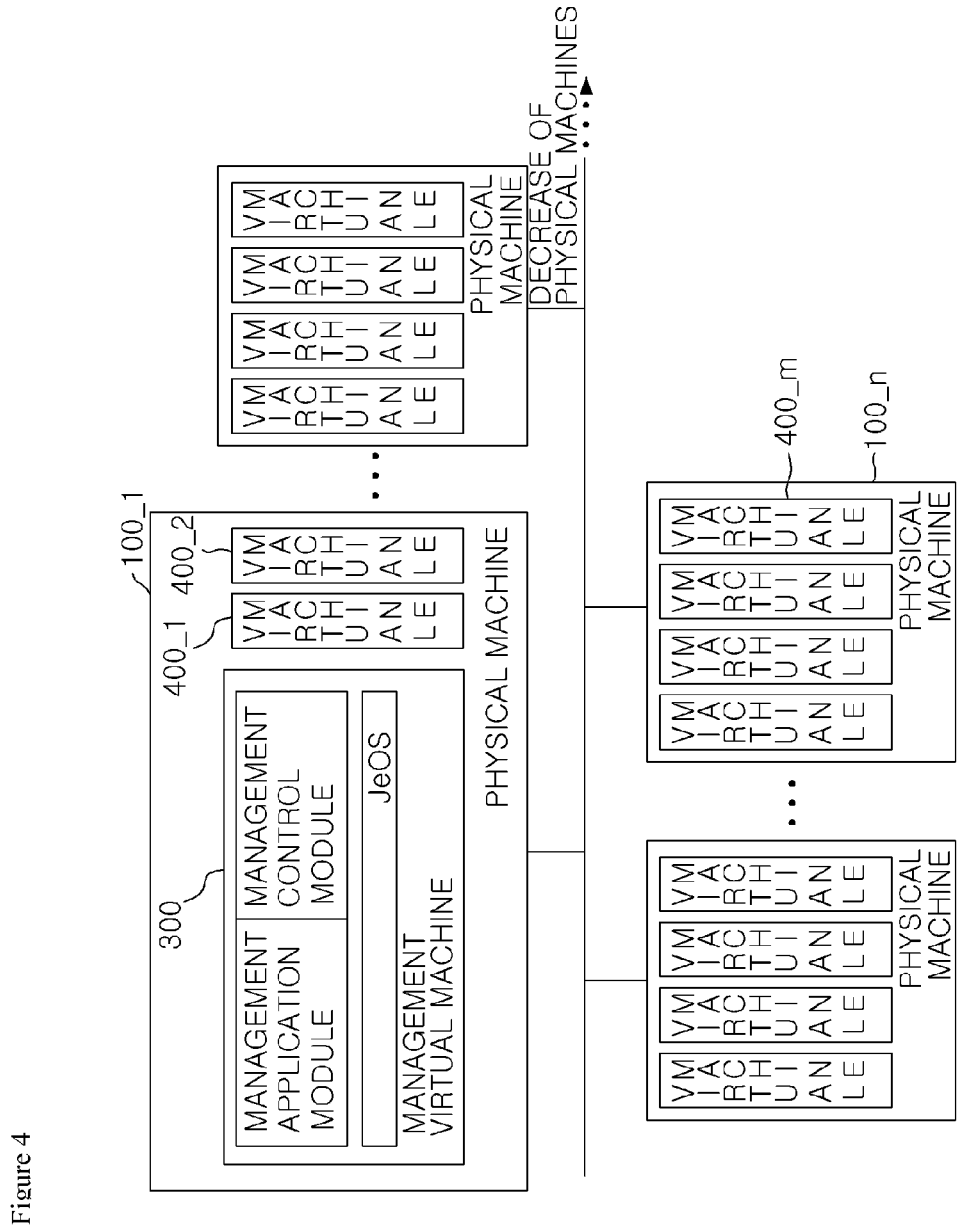
FIG. 4 is a block diagram illustrating an exemplary management virtual machine that requests resource reclamation when management workload decreases.
Figure 5:
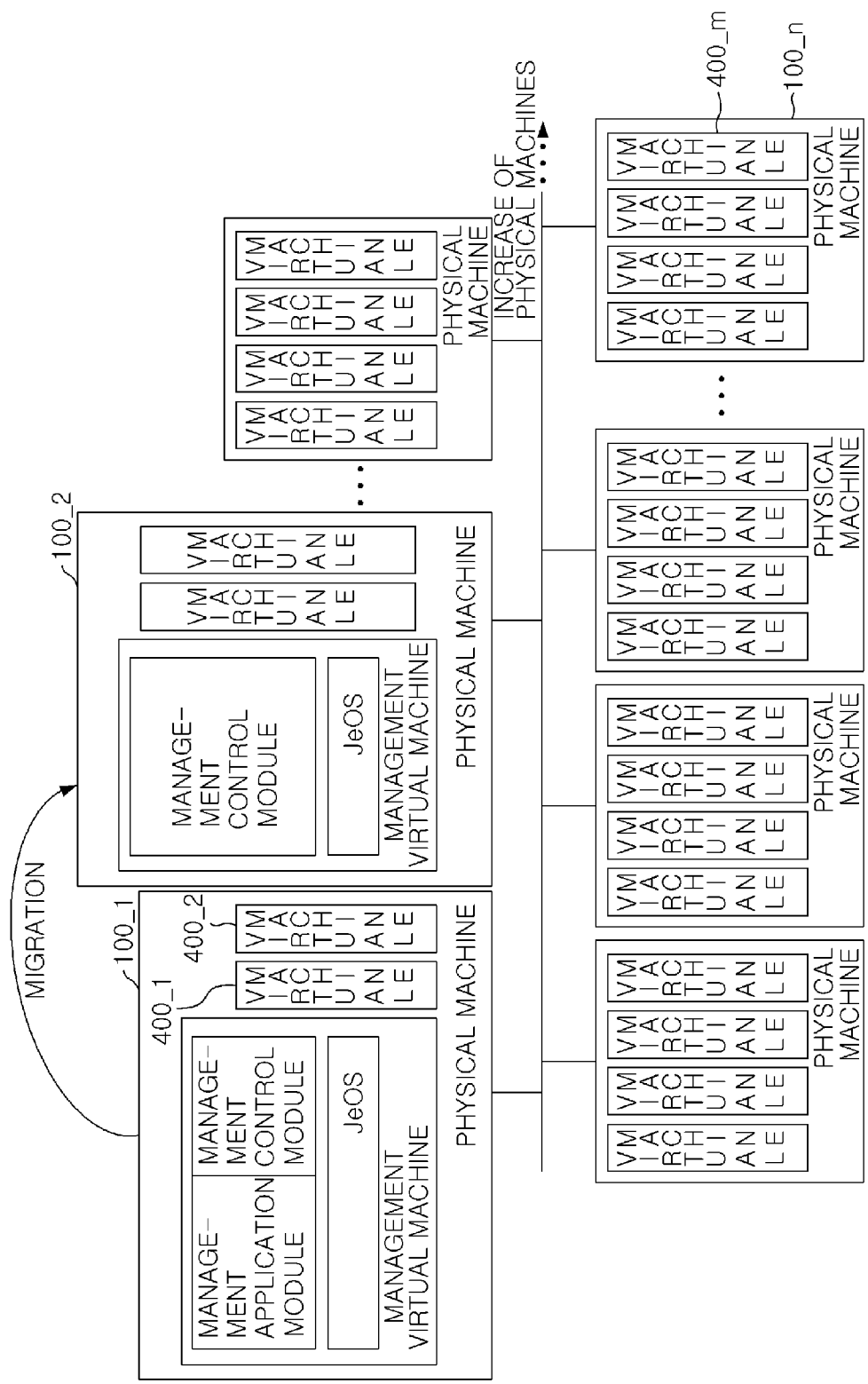
FIG. 5 is a block diagram illustrating an exemplary management virtual machine that is migrated from a first physical machine to any one of second to n-th physical machines when management workload increases.

FIGS. 3 to 5 are block diagrams explaining the resource reclamation, the resource reallocation and the migration of the management virtual machine 300 in the computing system 10 for virtualization-based resource management according to the exemplary embodiment.

FIG. 3 illustrates a case being performed the resource reallocation when the management workload increases for example, when the number of physical machines to be managed increases. FIG. 4 illustrates a case being performed the resource reclamation when the management workload decreases for example, when the number of physical machines to be managed decreases. FIG. 5 illustrates a case being migrated the management virtual machine 300 from the first physical machine 100_1 to one of the second to n-th physical machines 400_2 to 400_m when the management workload increases for example, when the amount of network resources utilized increases.

Referring to FIG. 3, the time cost increases, if the number of the physical machines 100_1 to 100_n managed by the management virtual machine 300 increases. When the time cost falls outside a predetermined allowable range, the deficiency of the resources may be recognized by the resource optimization module 333.

In this case, the instruction request module 334 requests the resource reallocation to the virtualization platform 200 through the virtualization platform interface 311, thus increasing the resources utilized by the management virtual machine 300. The resource reallocation may be performed by increasing the resources as much as the resource variation predefined by, or by additionally allocating the resources as much as the amount of resources monitored by the resource optimization module 333.

Referring to FIG. 4, the time cost decreases, if the number of the physical machines 100_1 to 100_n managed by the management virtual machine 300 decreases. When the time cost is less than the allowable range, the resource optimization module 333 determines that the resources are excessively allocated, and the instruction request module 334 requests the resources reclamation.

The resources may be reclaimed by a predefined resource variation, or by surplus amount to be calculated by the resource optimization module 333.

The reclaimed resources may be used in the additional creation of the virtual machines 400_1 to 400_m and the additional resource reallocations of the management virtual machine 300.

Referring to FIG. 5, the management virtual machine 300 monitors a total amount of network resources utilized by the physical machine 100_1 at which the management virtual machine 300 is currently located. If it is determined that all management objects are no more effectively controlled in the current physical machine 100_1, the management virtual machine 300 searches the physical machine 100_2 that utilizes the least amount of network resources, and determines whether the network resources utilized in the management virtual machine 300 is available. If available, the management virtual machine 300 requests the migration to the searched physical machine 100_2 through the virtualization platform interface 311.

That is, when the amount of network resources utilized by the first physical machine 100_1 exceeds a predetermined reference amount, the management virtual machine 300 monitors the amount of the network resources utilized by the second to n-th physical machines through the management virtual machine positioning module 332 and searches the second physical machine 100_2 that utilizes the least amount of the network resources. When the amount of the network resources utilized by the searched second physical machine 100_2 is less than the amount of the network resources utilized by the first physical machine 100_1, the management virtual machine 300 requests the migration to the second physical machine 100_2 through the instruction request module 334.

The migration may be performed as follows. The virtualization platform 200 of the first physical machine 100_1 requests the creation of the management virtual machine to the virtualization platform of the second physical machine 100_2. If the management virtual machine is created in the second physical machine 100_2, the management virtual machine created in the first physical machine 100_1 is removed.

Figure 6:
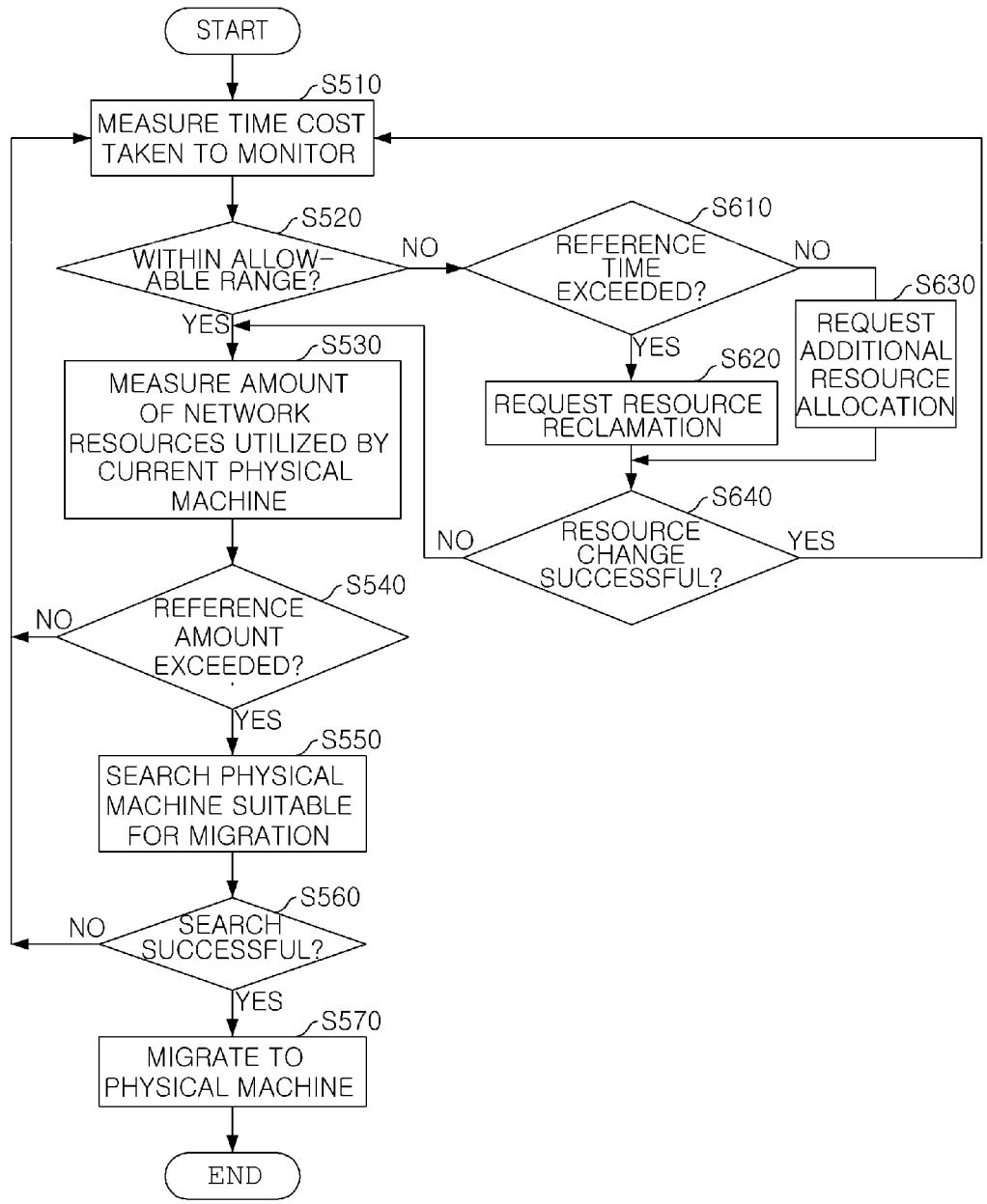
FIG. 6 is a flowchart illustrating an exemplary virtualization-based resource management method.

Hereinafter, a resource management method of the management virtual machine 300 included in the computing system 10 for virtualization-based resource management will be described in detail. FIG. 6 is a flowchart illustrating the virtualization-based resource management method of the management virtual machine 300 according to an exemplary embodiment.

Referring to FIG. 6, the management virtual machine 300 measures a time cost necessary to control entire resources within the computing system 10 in step S510.

In step S520, the management virtual machine 300 determines whether the measured time cost falls within a predetermined allowable range. In step S530, if the measured time cost falls within the allowable range, it is determined that the reallocation or reclamation of the resources required by the management virtual machine 300 is unnecessary, and an amount of network resources utilized by the physical machine 100_1, where the management virtual machine 300 is located, is measured in order to determine whether it is necessary to migrate the management virtual machine 300.

In step S540, the management virtual machine 300 determines whether the measured amount of the network resources utilized exceeds the reference amount. In step S550, when the measured amount of the network resources utilized exceeds the reference amount, the management virtual machine 300 confirms the amount of network resources utilized by other physical machines 100_2 to 100_n and searches whether there exists a physical machine suitable for the migration. That is, the management virtual machine 300 searches whether there exists a physical machine that utilizes the least amount of the network resources and utilizes a smaller amount of network resources than the physical machine at which the management virtual machine 300 is currently located.

In step S560, the management virtualization machine 300 determines whether the search operation is successful. In step S570, if successful, the management virtual machine 300 is migrated to the searched physical machine 100_2 according to the above-mentioned procedures.

If failed, it is determined that the first physical machine at which the management virtual machine 300 is currently located is an optimal physical machine, and then, the process returns to step S510 of measuring the time cost.

If it is determined in step S520 that the measured time cost falls outside the allowable range, the management virtual machine 300 determines whether the measured time cost exceeds the reference time or is less than the reference time.

In step S620, if the measured time cost is less than the reference time, it is determined that excessive resources more than an appropriate level are allocated to the management virtual machine 300, and then, the management virtual machine 300 requests the resource reclamation.

If the measured time cost exceeds the reference time, it is determined that the additional resource allocation is necessary because the current resources for management are deficient, and the management virtual machine 300 requests the additional resource allocation.

In step S640, the management virtual machine 300 determines whether the resource change such as the resource reclamation or the additional resource allocation is successful. If successful, the process returns to step S510 of measuring the time cost for control of the resources.

On the other hand, if failed, it is determined that the resource management is difficult in the first physical machine 100_1 at which the management virtual machine 300 is currently located, and the process returns to step S530 of measuring the amount of network resources utilized by the first physical machine 100_1 in order to try to migrate to other physical machine.

The above-mentioned procedures may be repeated periodically.

In the above description, the time cost means time taken for the management virtual machine 300 to manage the entire resources within the computing system, or a value converted into other domains except time.

The reference time is time determined to be appropriate when the management virtual machine 300 manages the resources within the computing system. The reference time may be previously set (for example, 10 seconds) by the system administrator, or may be dynamically set by the management virtual machine 300.

The allowable range is a time range defined by adding or subtracting a predetermined threshold time (for example, 1 second) to or from the reference time. For example, when the reference time is 10 seconds and the threshold time is 1 second, the allowable range will be 9 seconds to 11 seconds. The threshold time may also be previously set by the system administrator.

The reference amount that is compared with the amount of network resources utilized means network throughput that may be previously designated by the system administrator or provided by the corresponding physical machine.

Meanwhile, the reference time, the allowable range, and the reference amount defined in the above may be previously set by the system administrator, considering the scale and resource utilization characteristic of the computing system, or may also be dynamically set by the management virtual machine 300 or other devices within the computing system, considering the amount of available resources, the amount of resources consumed, and the scale of the system.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing system for virtualization-based resource management, the computing system comprising:
    a plurality of physical machines;
    a plurality of virtual machines configured by virtualizing each of the plurality of physical machines; and
    a non-transitory computer readable medium with computer readable instructions stored thereon, which, when executed by a processor, perform the following steps:
    measuring a time taken for the management virtual machine to read information on a list of the plurality of virtual machines, read information on a list of the plurality of physical machines, reading information on an amount of resources used, and read information on a resource allocation relationship;
    determining whether the measured time falls within an allowable range;
    if the measured time falls within the allowable range, comparing an amount of network resources used by a first physical machine on which the management virtual machine is located to a threshold value;
    if the amount of network resources exceeds the threshold value, migrating the management virtual machine to a second physical machine;

if the measured time exceeds the allowable range, allocating additional resources to the management virtual machine; and if the measured time is less than the allowable range, reclaiming resources allocated to the management virtual machine and allocating the reclaimed resources to machines other than the management virtual machine.

2. The computing system of claim 1, wherein the management virtual machine is operated by a Just Enough Operating System (JeOS).

3. The computing system of claim 1, wherein the plurality of physical machines comprise at least one of a web server, a web application server, and a cluster.

4. A virtualization-based resource management apparatus performing resource management of a computing system including a plurality of physical machines and a plurality of virtual machines configured by virtualizing each of the plurality of physical machines, the virtualization-based resource management apparatus comprising:
   a processor;
   a memory; and
   a non-transitory computer readable medium with computer readable instructions stored thereon, which, when executed by a processor, perform the following steps:
   measuring a time taken for the management virtual machine to read information on a list of the plurality of virtual machines, read information on a list of the plurality of physical machines, reading information on an amount of resources used, and read information on a resource allocation relationship;
   determining whether the measured time falls within an allowable range;
   if the measured time falls within the allowable range, comparing an amount of network resources used by a first physical machine on which the management virtual machine is located to a threshold value;
   if the amount of network resources exceeds the threshold value, migrating the management virtual machine to a second physical machine;
   if the measured time exceeds the allowable range, allocating additional resources to the management virtual machine;
   if the measured time is less than the allowable range, reclaiming resources allocated to the management virtual machine and allocating the reclaimed resources to machines other than the management virtual machine.

5. The virtualization-based resource management apparatus of claim 4, further comprising a Just Enough Operating System (JeOS) configured to support only functions associated with the management application module and the management control module.

6. A virtualization-based resource management method performing resource management of a computing system including a plurality of physical machines, a plurality of virtual machines configured by virtualizing each of the plurality of physical machines, and a management virtual machine, the virtualization-based resource management method comprising:
   measuring a time taken for the management virtual machine to read information on a list of the plurality of virtual machines, read information on a list of the plurality of physical machines, reading information on an amount of resources used, and read information on a resource allocation relationship;
   determining whether the measured time falls within an allowable range;
   if the measured time falls within the allowable range, comparing an amount of network resources used by a first physical machine on which the management virtual machine is located to a threshold value;
   if the amount of network resources exceeds the threshold value, migrating the management virtual machine to a second physical machine;
   if the measured time exceeds the allowable range, allocating additional resources to the management virtual machine;
   if the measured time is less than the allowable range, reclaiming resources allocated to the management virtual machine and allocating the reclaimed resources to machines other than the management virtual machine.

7. The virtualization-based resource management method of claim 6, further comprising returning to the step of measuring the time when the resource reclamation and the additional resource allocation are failed.

8. The virtualization-based resource management method of claim 6, further comprising repeating the step of measuring the time, the step of determining whether the measured time falls within the allowable range, and the step of comparing the amount of network resources to a threshold value when the amount of the network resources utilized is less than the threshold value.

9. The virtualization-based resource management method of claim 6, wherein the migrating to other physical machine comprises:
   measuring an amount of network resources utilized by the first physical machine at which the management virtual machine is currently located;
   searching the plurality of physical machines to determine a physical machine that uses the least amount of network resources, when the amount of the network resources utilized exceeds the reference amount, wherein the physical machine that uses the least amount of network resources is the second physical machine; and
   migrating the management virtual machine to the second physical machine, when the amount of the network resources utilized by the second physical machine is smaller than the amount of the network resources utilized by the first physical machine.

10. A virtualization-based resource management method of a management virtual machine located at any one of a plurality of physical machines where one or more virtual machines are executed, the virtualization-based resource management method comprising:
   selecting a physical machine that uses the least amount of network resources among the plurality of physical machines, and positioning the management virtual machine to the selected physical machine;
   collecting and managing information on the one or more virtual machines;
   measuring a time taken for the management virtual machine to read information on a list of the plurality of virtual machines, read information on a list of the plurality of physical machines, reading information on an amount of resources used, and read information on a resource allocation relationship;
   determining whether the measured time falls within an allowable range;
   if the measured time falls within the allowable range, comparing an amount of network resources used by a first physical machine on which the management virtual machine is located to a threshold value;

if the amount of network resources exceeds the threshold value, migrating the management virtual machine to a second physical machine;

if the measured time exceeds the allowable range, allocating additional resources to the management virtual machine;

if the measured time is less than the allowable range, reclaiming resources allocated to the management virtual machine and allocating the reclaimed resources to machines other than the management virtual machine.

11. The virtualization-based resource management method of claim 10, wherein the physical machine comprises at least one of a web server, a web application server, and a cluster.

* * * * *